Dec. 2, 1941.  G. S. ENSIGN  2,264,832

COIL WRAPPER

Filed July 28, 1938

INVENTOR.
Gordon S. Ensign
BY Peter Pacuck
ATTORNEY.

Patented Dec. 2, 1941

2,264,832

UNITED STATES PATENT OFFICE 2,264,832

COIL WRAPPER

Gordon S. Ensign, Chicago, Ill.

Application July 28, 1938, Serial No. 221,791

5 Claims. (Cl. 175—21)

This invention relates to the manufacture in quantity production of field and bucking coils, such as are used in radio speakers, and has for its object to provide a method and device to improve the winding and assembly of such coils and to effect substantial savings in material and labor.

Bucking and field coils have no electrical relationship with each other but in the assembly of radio speaker parts they have a physical or mechanical relationship and the practice has been, where the specifications require a bucking coil, to wind the field coil and the bucking coil on separate spools, attach lead wires to each terminal and assemble them in juxtaposition with the lead wires arranged in the positions specified for electrical connection with other parts of the unit. In such cases, the field coil axial length is shortened to provide space in the assembly for the bucking coil. This practice necessitates, for each size of speaker, the manufacture of field coil spools of one length for use without a bucking coil and the manufacture of field coil spools for a shorter length for use in conjunction with a bucking coil.

Further the practice has been to wind a binding and insulating sheath of adhesive tape around the field coil and over the coil terminals where they are joined, usually by twisting together, with the lead wires extending from the coil so that the joins are embedded in alternate layers of tape. This has numerous disadvantages, such as inaccessability of the lead wire and terminal joints making it difficult and expensive to repair or change lead wire and terminal connections with each other; the displacement under tension of the lead wire and terminal joints due to the soft resistance of the tape thereby making for short circuits or broken wires under the sheath; and the lack of interchangeability between coils provided with lead wires of different lengths and sizes due to cost of labor and material for unwrapping the sheath, disconnecting the joints and making new connections with different lead wires.

A principal object of the invention is to provide a novel method of winding and assembling field and bucking coils, whereby a bobbin sleeve common to both coils is placed upon a winding mandrel on which both coils can be wound either simultaneously or successively in a continuous operation of the same mandrel in unitary assembled relation to each other and the coils can be finished in assembly ready for installation as a unit in a radio speaker with the lead wires joined to the coil terminals and secured in the positions required for assembly with the other speaker parts.

Another object is to provide a combined field and bucking coil spool embodying a sleeve-like core of the same axial length of a field coil intended for an assembly without a bucking coil and the provision of bobbin ends, one being fixed at one extremity of the core and the other fixed in advance of the other extremity to provide a spool section with an axial protuberance for receiving and supporting a further bobbin end in spaced relation to the spool section from which the protuberance extends. With this assembly, a double spool is provided in which one section accommodates the field coil winding and the other section accommodates the bucking coil winding.

Another object is to provide an insulating sheath for the field coil and for anchoring the lead wires and the coil terminals physically independently of, but in electrical connection with each other, whereby the anchorage is readily accessible, is capable of resisting all normal tensions and provides easy interchangeability of lead wires. To this end, a strip of material preferably paper especially compounded for insulating is formed to overlie the coil winding and electrical conducting eyelets are secured to the strip through which eyelets the coil terminals are passed, soldered thereto and the surplus wire removed. The lead wires are also soldered to the eyelets thus providing an independent accessible anchoring for the lead wires but in electrical connection with the coil terminals, the sheath serving to take the tension from the lead wires as they are pulled through a radio speaker incident to the assembly thereof.

Another object is to provide a coil sheath in the manufacture of which a minimum amount of material and labor is required, the sheath being relatively stiff but flexible and being formed with a projecting tab positioned where it can be folded under the strip section carrying the electrical conductor to thereby protect the coil winding insulation from injury during soldering of the terminals and lead wires to the electrical conductors.

In the accompanying drawing.

Figure 1:
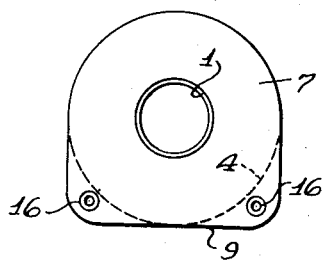
Fig. 1 is a top plan view.
Figure 2:
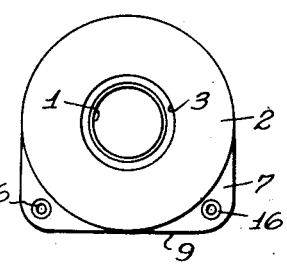
Fig. 2 is a bottom plan.
Figure 3:
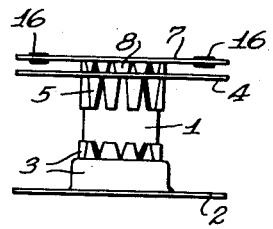
Fig. 3 is an elevation of the spool.
Figure 4:
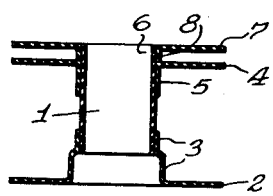
Fig. 4 is a longitudinal section of the spool.
Figure 5:
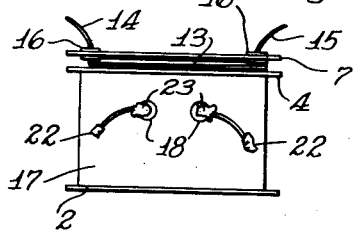
Fig. 5 is an elevation of a completed coil assembly.
Figure 6:
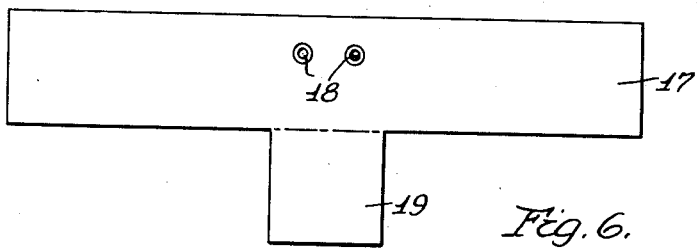
Fig. 6 is a plan view of the wrapper.

The present spool comprises a sleeve-like core 1, formed of insulation, and having a disk-like bobbin end 2 mounted on one end thereof. The bobbin end 2 has a central portion 3 struck therefrom to fit over the core 1, and which is secured to the core 1 by a suitable adhesive. Spaced inwardly from the other end of the core 1 is a similar bobbin end 4, also having a central portion 5 struck therefrom to fit over the core 1, and secured to the core by an adhesive. On the protruding end 6 of the core 1 is mounted a third bobbin end 7 having a central portion 8 struck therefrom and fitting over the end of the core. The central portion 8 bears against the bobbin end 4 to provide a definite space between the bobbin ends 4 and 7, and is secured to the core 1 by an adhesive.

The bobbin ends 2 and 4 are circular in shape, whereas the bobbin end 7 has a straight edge thereon. The spool thus provided, which is provided with coil windings as hereinafter described, is usually installed in a conventional coil pot of U-shape. The purpose of the straight edge 9 is to engage one of the parallel arms of the coil pot whereby it functions as a locating means for correctly positioning the spool so that its lead wires are properly disposed.

Between the two bobbin ends 2 and 4 is a field coil winding 10, the terminals of the winding being designated 11 and 12. Between the two bobbin ends 4 and 7 is a bucking coil winding 13 having its terminals 14 and 15 extending through metal eyelets 16 in the bobbin end 7. Both winding operations are performed on the same mandrel, either simultaneously or successively without removing the spool therefrom.

Figure 7:
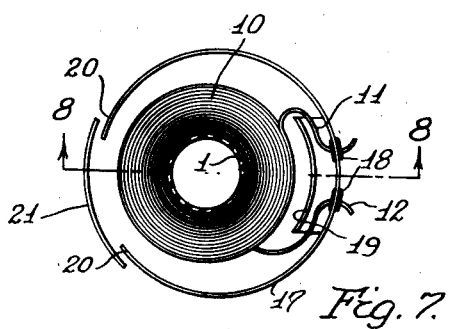
Fig. 7 is an exploded view, partly in section, illustrating the wrapper assembly.
Figure 9:
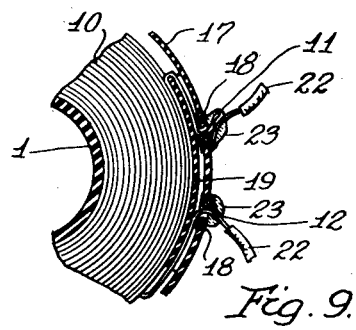
Fig. 9 is an enlarged fragmental section illustrating the lead wire anchorage.
Figure 8:
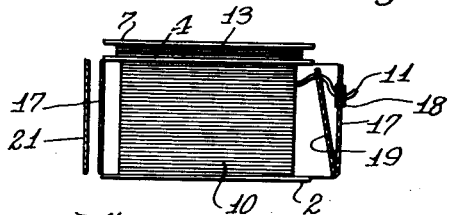
Fig. 8 is a view, partly in section, taken approximately on the plane of line 8—8 of Fig. 7.

The field coil winding is enclosed by an insulating sheath 17 composed of an elongate strip having two metal eyelets 18 therein and an integral tab 19 adapted to be folded whereby it underlies the eyelets. As may be seen in the exploded views, Figs. 7 and 8, the sheath is placed about the field winding 10 with the tab 19 folded inwardly. The winding terminals 11 and 12 are then threaded between the tab 19 and the sheath and through the eyelets 18. The sheath 17 is then drawn tight about the winding 10. Its free ends 20 are then secured together by an adhesive strip 21, placed in contact therewith. The ends 20 may either meet, overlap or be spaced apart provided the sheath affords the required resistance to tension.

After the wrapper has been assembled as above described, lead wires 22 are soldered at 23 to the eyelets 18, and are thereby anchored to the sheath independently of our mechanical connection with the field coil terminals. The terminals 11 and 12 of the coil winding 10 are secured to the eyelets 18, in electrical connection with the lead wires 22, by the same soldering operation.

I claim:

1. A coil wrapper comprising a strip of flexible material adapted to be wound upon the coil and metal contact points secured to the strip, each point being adapted to receive a coil terminal and a lead wire from the coil in heat induced union therewith and heat insulating means integral with the strip and formed to underly the contact points by bending said means relatively to the strip.

2. A unitary sheath and contact anchorage for binding upon a coil comprising metallic contacts, and a strip of relatively stiff but flexible nonconducting material to which strip the contact points are affixed, said strip being adapted to cover the periphery of the coil and being formed with a lateral portion projecting therefrom and integral therewith, said lateral portion being formed to fit across the strip under the contact points and being adapted to be bent to underly the contact points.

3. A unitary sheath and anchorage for binding upon a coil comprising metallic contacts, and a strip of relatively stiff but flexible nonconducting material to which the contact points are affixed, to receive the coil terminals and leads therefrom in bound relation to the coil, said strip being formed with a heat insulating portion integral therewith and said portion being positioned to underly the contact points and being adapted to be bent under the strip into said underlying position.

4. A unitary sheath for binding upon the periphery of a coil comprising metallic contact points, a flexible strip adapted to receive and hold the contact points in fixed relation thereto, said strip being formed with a flexible lateral portion, said portion being formed to extend across the portion of the strip receiving the contact points and being positioned at an edge of the contact receiving portion of the strip.

5. A unitary sheath for binding upon the periphery of a coil comprising electrical connectors, a strip carrying said connectors and adapted to be bound upon the coil to cover the periphery thereof and means flexibly secured to the strip and formed to underly the connectors and being adapted to provide heat and electrical insulation between the connectors and the coil by bending of said means into a position underlying the strip.

GORDON S. ENSIGN.